United States Patent [19]
Yamamoto et al.

[11] Patent Number: 5,277,286
[45] Date of Patent: Jan. 11, 1994

[54] METHOD OF CONTROLLING AUTOMATIC CLUTCH FOR MOTOR VEHICLES

[75] Inventors: Yoshinori Yamamoto; Yoshikazu Ishikawa, both of Saitama, Japan

[73] Assignee: Honda Giken Kogyo Kabushiki Kaisha, Tokyo, Japan

[21] Appl. No.: 971,334

[22] Filed: Nov. 4, 1992

[30] Foreign Application Priority Data

Nov. 6, 1991 [JP] Japan .................................. 3-318369

[51] Int. Cl.$^5$ .................... F16D 43/24; B60K 41/28
[52] U.S. Cl. ................ 192/0.033; 192/0.052; 192/103 C; 60/468
[58] Field of Search ............... 192/103 C; 192/.052; 192/.033; 192/103 R; 192/.055; 60/468

[56] References Cited

U.S. PATENT DOCUMENTS

| | | | |
|---|---|---|---|
| 4,730,709 | 3/1988 | Kawata et al. | 192/103 C X |
| 4,732,248 | 3/1988 | Yoshimura et al. | 192/0.055 |
| 4,834,226 | 5/1989 | Ohkuma et al. | 192/103 C X |
| 4,913,270 | 4/1990 | Ishido et al. | 192/103 C X |
| 4,941,371 | 7/1990 | Koyama et al. | 74/865 |

FOREIGN PATENT DOCUMENTS

| | | |
|---|---|---|
| 60-8553 | 1/1985 | Japan . |
| 62-238132 | 10/1987 | Japan . |
| 1-105062 | 4/1989 | Japan . |

*Primary Examiner*—Rodney H. Bonck
*Attorney, Agent, or Firm*—Lyon & Lyon

[57] ABSTRACT

A vehicle speed is determined from a detected signal, e.g., pulses produced by a rotation sensor for detecting rotation of the output shaft of a transmission, which signal corresponds to rotation of road wheels. Then, the deceleration of the vehicle speed is calculated from the detected vehicle speed, and then a rate of change of the deceleration is calculated from the calculated deceleration. If the rate of change of the deceleration is larger than a predetermined value, thereby indicating a panic braking condition of the vehicle, an automatic clutch incorporated in the transmission is disengaged to prevent stalling of the vehicle engine.

10 Claims, 5 Drawing Sheets

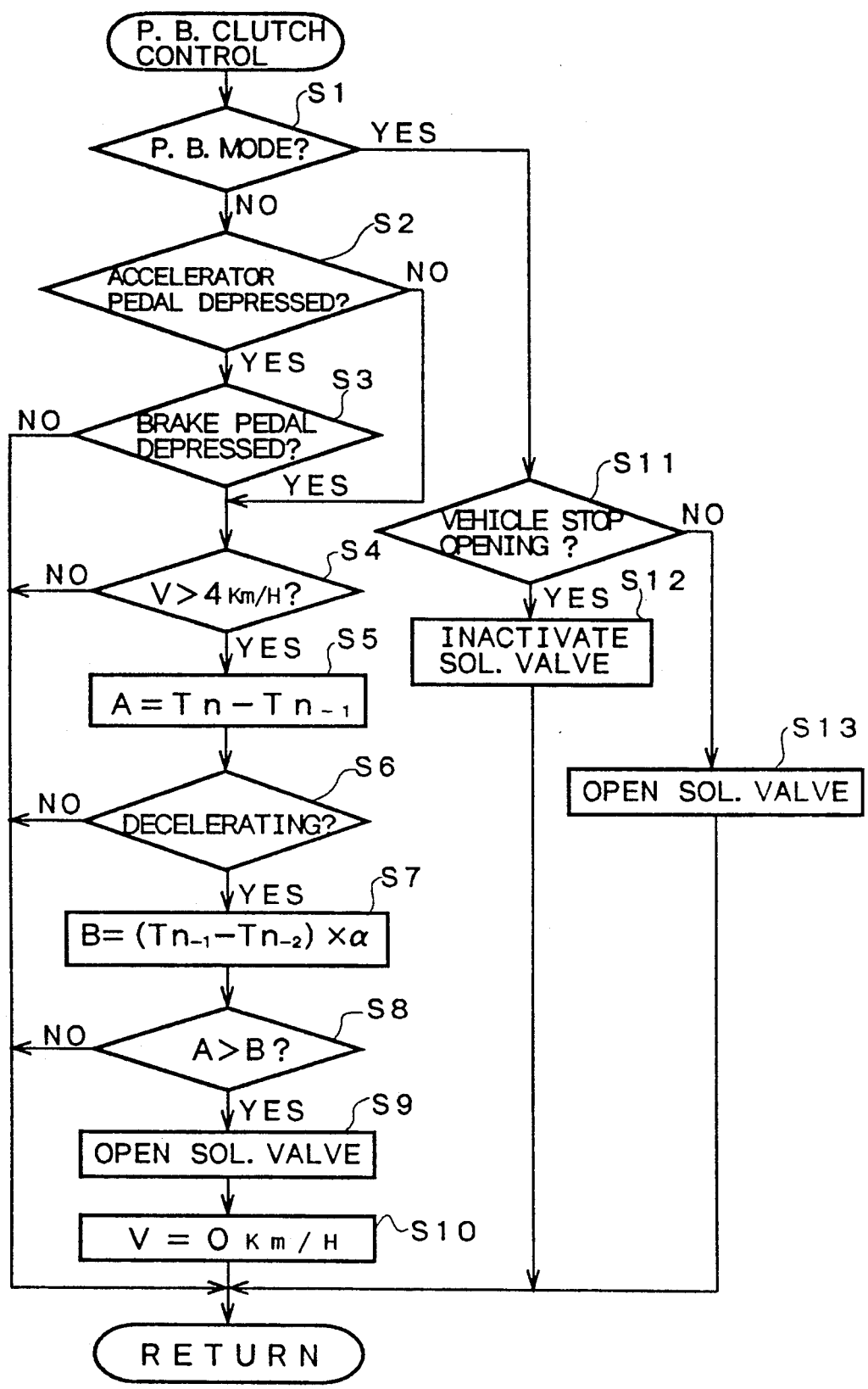

METHOD OF CONTROLLING AUTOMATIC CLUTCH FOR MOTOR VEHICLES

BACKGROUND OF THE INVENTION

1. Field of the Invention

The present invention relates to a method of controlling an automatic clutch which is controlled in operation depending on the engine rotational speed, vehicle speed, etc., of a motor vehicle such as an automobile, and more particularly to a method of controlling an automatic clutch upon quick deceleration of the motor vehicle as when it is abruptly braked.

2. Description of the Prior Art

There are known automatic clutches employed in automatic transmissions, continuously variable transmissions, or the like. For example, Japanese laid-open patent publication No. 60-8553 discloses an automatic clutch in an automatic transmission, and Japanese laid-open patent publications Nos. 62-238132 and 1-105062 show automatic clutches in continuously variable transmissions.

The automatic clutch is engaged when movement of the motor vehicle is to be started, and disengaged when the motor vehicle is to be decelerated to a stop. If the automatic clutch were not disengaged until after the motor vehicle is completely stopped, then the engine would stall. Usually, therefore, the clutch is disengaged when the speed of the motor vehicle becomes lower than a predetermined speed.

There are instances where, while the motor vehicle is running, the driver is required to abruptly apply the brake to stop motor vehicle. Since the automatic clutch is usually disengaged when the vehicle speed decreases to a predetermined speed, the engine may be stalled because the disengagement of the clutch is slow.

In the automatic transmission disclosed in Japanese laid-open patent publication No. 60-8553 and the continuously variable transmission disclosed in Japanese laid-open patent publication No. 1-105062, if the deceleration of the motor vehicle is of a predetermined level or higher, then the clutch is disengaged to prevent the engine from stalling even when the vehicle speed is higher than a predetermined speed.

In the continuously variable transmission disclosed in Japanese laid-open patent publication No. 1-105062, if the deceleration of the motor vehicle is judged as a predetermined quick deceleration, then the predetermined speed, i.e., the vehicle speed below which the automatic clutch is disengaged, is set to a high-speed level for disengaging the automatic clutch early, thereby preventing the engine from stalling.

However, when the motor vehicle is so abruptly braked (e.g., a so-called panic brake is applied) that the road wheels are locked, since the rotational speed of the road wheels decreases to zero very rapidly, it is difficult to prevent the engine from stalling even with the conventional control processes disclosed in the above publications. Specifically, according to the conventional control processes, the clutch is disengaged if the deceleration of the motor vehicle is of a predetermined level or higher when the motor vehicle is quickly decelerated. Actually, however, in the case of a panic brake, the speed of the motor vehicle has already been decelerated to a certain level when the deceleration reaches the predetermined level. Starting to disengage the automatic clutch upon arrival of the deceleration at the predetermined level may be too late, thereby resulting in an engine stall.

SUMMARY OF THE INVENTION

It is an object of the present invention to provide a method of controlling an automatic clutch while predicting, at an initial stage of an abrupt braking action, whether the abrupt braking action is so intensive that the braked road wheels will be locked.

Another object of the present invention is to provide a method of controlling an automatic clutch so that the automatic clutch is immediately disengaged when an abrupt braking action intensive enough to lock the braked road wheels is predicted.

Still another object of the present invention is to provide a method of controlling an automatic clutch so as to the prevent an engine from stalling when an abrupt braking action intensive enough to lock the braked road wheels is applied.

To achieve the above objects, according to the present invention, the vehicle speed is detected repeatedly from a signal, e.g., pulses produced by a rotation sensor for detecting rotation of the output shaft of the transmission on the motor vehicle, which signal corresponds to rotation of road wheels of the motor vehicle. Then, the deceleration of the vehicle speed is calculated from the detected vehicle speeds, and then a rate of change of the deceleration is calculated from the calculated deceleration. If the rate of change of the deceleration is larger than a predetermined value, an automatic clutch incorporated in the transmission is disengaged.

As long as the clutch is engaged, the vehicle speed can be calculated from the speed of rotation of the engine if the speed reduction ratio of the transmission is known. Therefore, the vehicle speed may be calculated based on the signal representative of rotation speed of the engine and the speed reduction ratio of the transmission.

When the rate of change of the deceleration is large, the deceleration is rapidly increasing. If it is predicted that the deceleration is rapidly increasing because of a large rate of change of the deceleration, then the clutch is controlled so as to be immediately disengaged before the deceleration is actually increased. Therefore, when the motor vehicle is abruptly braked such as when a panic brake is applied, the clutch is disengaged early before the road wheels are locked, thus preventing the engine of the motor vehicle from stalling.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a flow chart of the sequence of the method according to the present invention;

DETAILED DESCRIPTION OF THE PREFERRED EMBODIMENT

Figure 1:
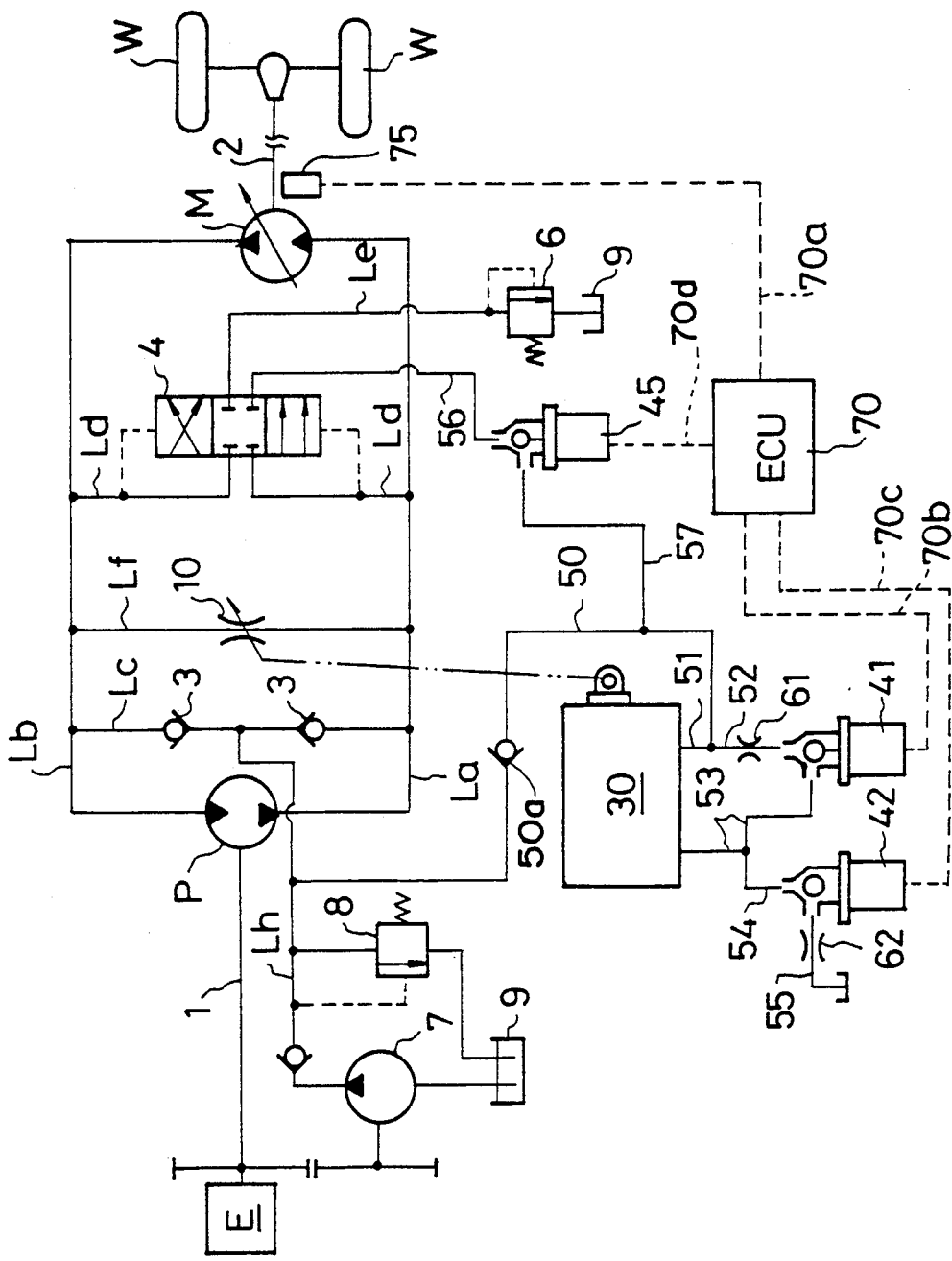
FIG. 1 is a circuit diagram of a hydraulic circuit of a continuously variable transmission incorporating an automatic clutch which is controlled by a method according to the present invention.

As shown in FIG. i, a hydraulic circuit of a continuously variable transmission incorporating an automatic clutch which is controlled by a method embodying the present invention has a fixed-displacement pump P having an input shaft 1 rotatable by an engine E of a motor vehicle, and a variable-displacement hydraulic motor M having an output shaft 2 for rotating road wheels W. The hydraulic pump P and motor M are connected in a closed hydraulic circuit by a first hydraulic passage La interconnecting an outlet port of the pump P and an inlet port of the motor M and a second hydraulic passage Lb interconnecting an inlet port of the pump P and an outlet port of the motor M.

When the hydraulic pump P is actuated by the engine E through the input shaft 1, the hydraulic pump P generates a hydraulic pressure that is applied to rotate the hydraulic motor M, which causes the output shaft 2 to rotate the road wheels W.

The hydraulic motor M may comprise a swash-plate axial-piston motor, for example, and the speed reduction ratio of the continuously variable transmission can continuously be varied by controlling the angle of the swash plate of the hydraulic motor M. The control of the angle of the swash angle is well known in the art, and will not be described in detail.

A charging pump 7 actuatable by the engine E is connected to the closed hydraulic circuit through a charging hydraulic passage Lh and a third hydraulic passage Lc. The third hydraulic passage Lc has a pair of check valves 3 which are selectively opened to supply working oil discharged by the charging pump 7, which working oil is regulated in pressure by a relief valve 8 to a lower-pressure, to either one of the hydraulic passages La, Lb.

A fourth hydraulic passage Ld having a shuttle valve 4 is also connected to the closed hydraulic circuit. The shuttle valve 4 comprises a two-port three-position directional control valve which is shiftable depending on the difference between the hydraulic pressures in the first and second hydraulic passages La, Lb, for connecting the lower-pressure one of the hydraulic passages La, Lb to a fifth hydraulic passage Le and the higher-pressure one of the hydraulic passages La, Lb to a hydraulic line 56. The fifth hydraulic passage Le is connected to a low-pressure relief valve 6 which regulates the hydraulic pressure from the lower-pressure one of the hydraulic passages La, Lb.

The first and second hydraulic passages La, Lb are interconnected by a sixth hydraulic passage Lf having a clutch valve 10 which comprises a variable restriction for controlling the opening of the sixth hydraulic passage Lf. When the clutch valve is controlled, the rate of working oil flowing from the hydraulic pump P to the hydraulic motor M is controlled for controlling the transfer of the driving force from the engine E to the road wheels W through the continuously variable transmission.

The clutch valve 10 is controlled by a clutch servo mechanism 30 which is in turn controlled by a pair of first and second solenoid-operated valves 41, 42 whose duty cycle is controlled by a control signal from a controller 70.

Therefore, the clutch valve is controlled in operation by the control signal from the controller 70. The controller 70 is supplied with a pulse signal over a line 70a from a rotation sensor 75 that detects rotation of the output shaft 2. The controller 70 calculates a vehicle speed, etc., from the supplied pulse signal for automatic clutch control according to the present invention.

Although not shown, the controller 70 is also supplied with signals representative of the engine rotational speed, the engine throttle opening, the swash plate angle of the hydraulic motor M, the accelerator pedal depression, etc. The controller 70 processes the supplied signals to control the clutch valve 10 to achieve a desired control mode for the motor vehicle.

Figure 2:
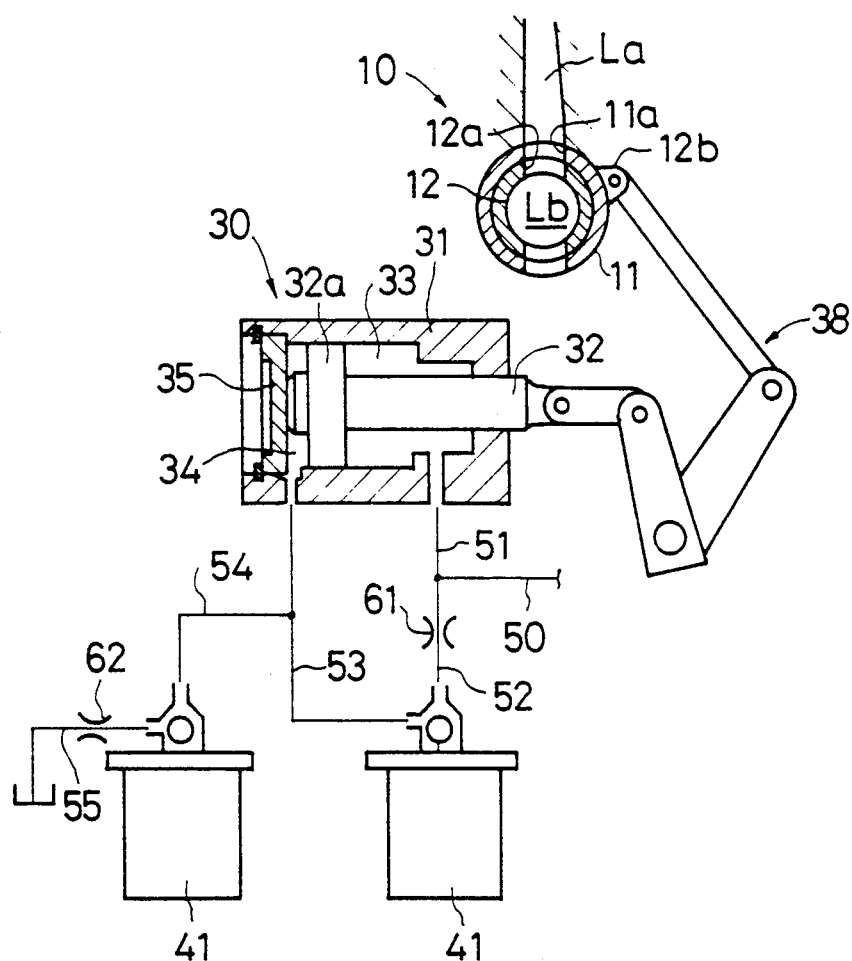
FIG. 2 is a cross-sectional view of a clutch servo mechanism for actuating the automatic clutch.

As shown in FIG. 2, the clutch servo mechanism 30 comprises a cylinder 31, a piston assembly 32 slidably fitted in the cylinder 31, and a cover 35 attached to the cylinder 31 in covering relationship to a cylinder chamber defined in the cylinder 31 and receiving the piston assembly 32. The piston assembly 32 has a piston 32a dividing the cylinder chamber into right and left (as viewed in FIG. 2) cylinder chambers 33, 34 that are connected to hydraulic lines 51, 53, respectively.

The hydraulic line 51 is connected to the charging hydraulic passage Lh through a hydraulic line 50 having a check valve 50a (see FIG. 1). Therefore, the hydraulic line 51 is supplied with the working oil regulated in pressure by the relief valve 8. The hydraulic line 51 is also connected to the first solenoid-operated valve 41 through a hydraulic line 52 having a first orifice 61, and to a hydraulic line 53 through the first solenoid-operated valve 41. The hydraulic line 53, which is connected to the left cylinder chamber 34, is connected to a hydraulic line 54 joined to the second solenoid-operated valve 42. The hydraulic line 54 is connected through the second solenoid-operated valve 42 to hydraulic line 55 having a second orifice 62, the hydraulic line 55 being connected to drain.

Thus, a charging pressure P1 from the charging pump 7 is supplied to the right cylinder chamber 53, and a control pressure P2 (F1 > P2) is developed in the hydraulic line 53 by the first and second solenoid-operated valves 41, 42 which are controlled in duty cycle. The pressure-bearing area of the right cylinder chamber 33 is smaller than the pressure-bearing area of the left cylinder chamber 34 because of the piston rod connected to the piston 32a. Therefore, the piston assembly 32 is held in equilibrium when the hydraulic pressure in the left cylinder chamber 34 is of a level which is lower than the hydraulic pressure in the right cylinder chamber 33.

When the hydraulic pressure supplied from the hydraulic line 53 to the left cylinder chamber 34 is controlled by the first and second solenoid-operated valves 41, 42, the piston assembly 32 can be moved to the right or left. The first and second solenoid-operated valves 41, 42 are controlled by control signals transmitted from the controller 70 over respective signal lines 70b, 70c (see FIG. 1).

As shown in FIG. 1, a hydraulic line 57 connected to a third solenoid-operated valve 45 is connected to the hydraulic line 50. The hydraulic line 57 is coupled through the third solenoid-operated valve 45 to the hydraulic line 56. Since the hydraulic line 56 is connected through the shuttle valve 4 to the higher-pressure one of the hydraulic passages La, Lb, when the third solenoid-operated valve 45 is opened, the check valve 50a is closed, and working oil is supplied from the higher-pressure one of the hydraulic passages La, Lb to the hydraulic line 50.

Therefore, when the third solenoid-operated valve 45 is opened, the working oil is supplied under high pressure through the hydraulic lines 50, 51 to the right cylinder chamber 33, quickly moving the piston assembly 32 to the left. The third solenoid-operated valve 45 is controlled by a control signal transmitted from the controller 70 over a signal line 70d.

As shown in FIG. 2, the leftward or rightward movement of the piston assembly 32 is transmitted through a link mechanism 38 to the clutch valve 10. The clutch valve 10 comprises a fixed member 11 having a first valve port 11a and a rotatable member 12 rotatably disposed in the fixed member 11 and having a second valve port 12a. The first and second valve ports 11a, 12a communicate with each other through a variable opening ranging from a fully open condition to a fully closed condition. The link mechanism 38 is operatively connected between the piston assembly 32 and an arm 12b which is attached to the rotatable member 12. When the piston assembly 32 moves, the link mechanism 38 causes the rotatable member 12 to rotate. When the rotatable member 12 rotates, the opening through which the first and second valve ports 11a, 12a communicate with each other varies from the fully open condition to the fully closed condition. Specifically, when the piston assembly 32 is fully moved to the left as shown in FIG. 2, the opening of the clutch valve 10, i.e., the opening through which the first and second valve ports 11a, 12a communicate with each other, is in the fully open condition. As the piston assembly 32 moves to the right, the opening of the clutch valve 10 gradually varies to the fully closed condition.

The first valve port 11a communicates with the first hydraulic passage La of the closed hydraulic circuit of the continuously variable transmission, the second valve port 12a with the second hydraulic passage Lb. Therefore, when the opening through which the first and second valve ports 11a, 12a communicate with each other is varied, the opening of the sixth hydraulic passage Lf interconnecting the first and second valve ports 11a, 12a is varied for clutch control. Consequently, automatic clutch control can be achieved by controlling the duty cycles of the first and second solenoid-operated valves 41, 42 with control signals from the controller 70.

When the third solenoid-operated valve 45 is opened, it is possible to quickly vary the opening through which the first and second valve ports 11a, 12a communicate with each of the from the fully closed condition to the fully open condition.

Basically, the clutch control according to the present invention is aimed at controlling the opening of the clutch valve 10 when the motor vehicle is to start and stop, and there are predetermined target clutch openings depending on the throttle opening and the vehicle speed. The controller 70 supplies duty-cycle control signals to the solenoid-operated valves 41, 42 to cause the opening of the clutch valve 10 to reach a target clutch opening which corresponds to the throttle opening and the vehicle speed that are detected at the present time.

If the motor vehicle which is running is decelerated to a stop, then when the vehicle speed is reduced to a certain speed, the controller 70 controls the solenoid-operated valves 41, 42 to open the clutch valve 10 for preventing the engine from stalling.

Controlling the operation of the clutch valve 10 at the time the motor vehicle is to be stopped will be described in detail with reference to FIGS. 3A, 3B and 3C.

Figure 3A:
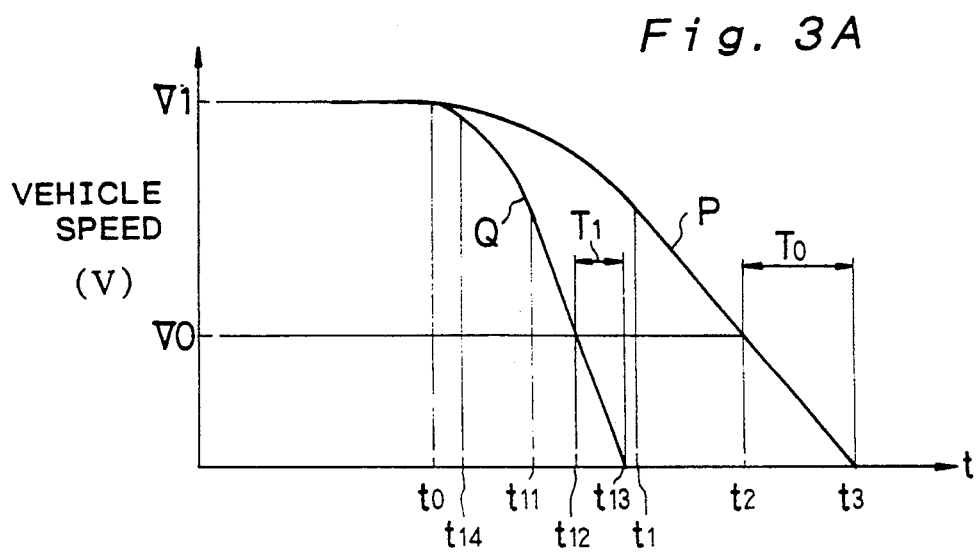
FIG. 3A, 3B and 3C are graphs showing how a vehicle speed (V), a deceleration (dV/dt), and a rate of change of deceleration ($d^2V/dt^2$) vary with time when the brake is applied.
Figure 3B:
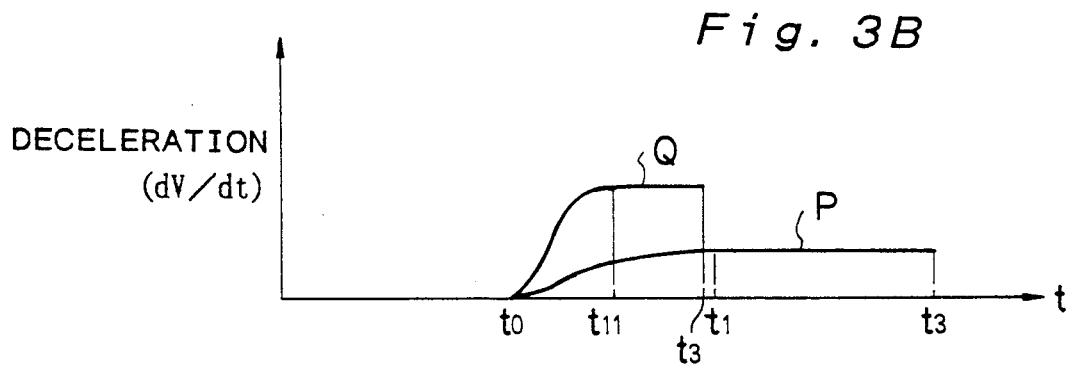

It is assumed that, as shown in FIG. 3A, while the motor vehicle runs at a speed V1, it is braked normally at a time t0 and its vehicle speed V is reduced as indicated by a curve P. When the vehicle speed V is reduced to a predetermined speed V0 at a time t2, the controller 70 applies valve opening control signals to the solenoid-operated valves 41, 42 to start opening the clutch valve 10. Since the vehicle speed V is relatively gradually reduced as indicated by the curve P, a period To of time consumed until the motor vehicle comes to a stop is relatively long. The clutch valve 10 is opened in the period To of time, and the engine is prevented from stalling when the motor vehicle is stopped.

When the motor vehicle is abruptly braked, i.e., when a so-called panic brake is applied, the road wheels W are locked within a short period of time from the time t0 at which the brake is applied, and the vehicle speed V, i.e., the rotational speed of the road wheels W, as detected by the rotation sensor 75 is rapidly lowered as indicated by a curve Q. If the clutch valve 10 were controlled to start opening after the vehicle speed V has dropped to the predetermined speed V0 at a time t12, as described above, then because the road wheels W are stopped in a very short period of time T1 from the time t12 to a time t13, the vehicle speed V would become zero before the clutch valve 10 is opened. Therefore, the engine is forcibly stopped, i.e., stalled.

According to the present invention, if the motor vehicle is abruptly braked, such an abrupt braking action is predicted in an initial stage of the braking action for easily opening of the clutch valve 10. The clutch valve 10 may be opened early by controlling the first and second solenoid-operated valves 41, 42. However, inasmuch as the first and second solenoid-operated valves 41, 42 normally control the clutch servo mechanism 30 under the relatively low charging pressure Pl and hence the clutch servo mechanism 30 operates with a slow response, the clutch valve 10 is actually opened quickly by opening the third solenoid-operated valve 45.

To control the clutch valve 10 to open quickly, the controller 70 differentiates the vehicle speed V to calculate a deceleration $dV/dt$, and then differentiates the deceleration $dV/dt$ to calculate a rate of change of the deceleration $d^2V/dt^2$. When the vehicle speed V varies as indicated by the curves P, Q in FIG. 3A, the deceleration $dV/dt$ and the rate of change of the deceleration $d^2V/dt^2$ vary as indicated by curves P, Q in FIGS. 3B and 3C. The vehicle speeds indicated by the curves F, Q in FIG. 3A are lowered at an increasing rate until respective times t1, t11, (as shown by curved positions of the curves P, Q) and thereafter lowered at a constant rate (as shown by the straight portions). Therefore, the rate of change of the deceleration is zero after the times t1, t11.

Figure 3C:
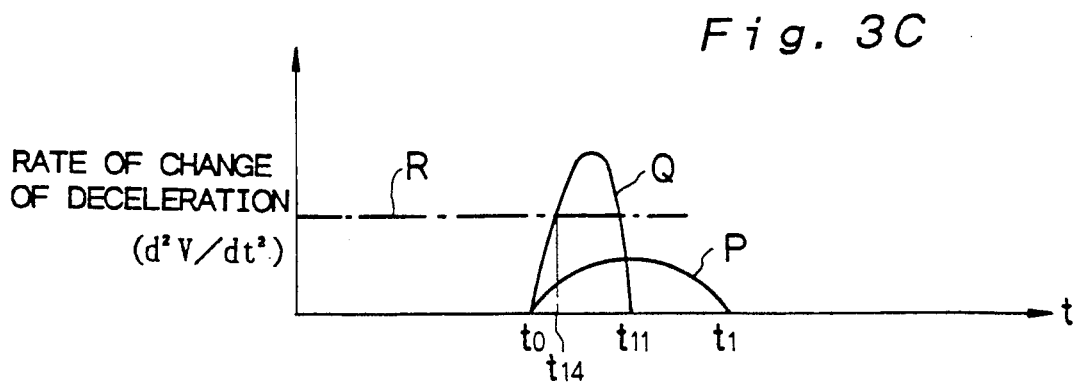

The controller 70 determines whether the applied brake is a panic brake or not by determining whether the rate of change of the deceleration $d^2V/dt^2$ is higher than a predetermined value R or not as shown in FIG. 3C. When the motor vehicle is braked as indicated by the curve P in FIG. 3A, the rate of change of the deceleration $d^2V/dt^2$ is smaller than the predetermined value R. Therefore, the controller 70 controls the first and second solenoid-operated valves 41, 41 to open the clutch valve 10 after the vehicle speed V has dropped to the predetermined speed V0.

When the motor vehicle is braked as indicated by the curve Q in FIG. 3A, the rate of change of the deceleration $d^2V/dt^2$ is larger than the predetermined value R. Consequently, the controller 70 determines that the applied brake is a panic brake at a time t14 when the rate of change of the deceleration $d^2V/dt^2$ exceeds the predetermined value R. The controller 70 now applies a control signal to open the third solenoid-operated valve 45. When a panic brake is applied., therefore, the clutch valve 10 is rapidly opened at an initial stage of the braking action, i.e., at the time t14, before the road wheels W are locked or stopped, so that the engine is reliably prevented from stalling.

The above control process of opening the clutch valve 10 when a panic brake is applied will be described in more specific detail with reference to FIG. 4.

Figure 5:
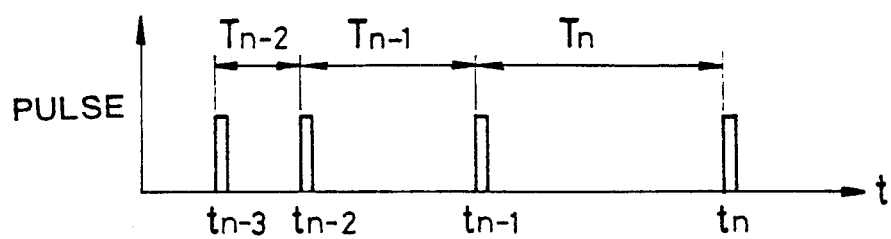
FIG. 5 is a graph showing output pulses from a rotation sensor.

The control process shown in FIG. 4 is carried out based on output pulses from the rotation sensor 75. It is assumed that the rotation sensor 75 produces output pulses as shown in FIG. 5.

In a step S1, the controller 70 determines whether it is in a panic brake mode or not. If not in a panic brake mode, then the controller 70 determines whether the accelerator pedal is depressed or not in a step S2, and then determines whether the brake pedal is depressed or not in a step S3. While the motor vehicle is cruising at a low speed on a slippery road, the vehicle speed is unstable and hence a decision error might occur if based only on changes in the vehicle speed. The steps S2, S3 are included to avoid such a decision error.

If the accelerator pedal is not depressed in the step S2, or if the accelerator pedal is depressed in the step S2 and then the brake pedal is depressed in the step S3, then control goes to a step S4. If the brake pedal is not depressed in the step S3, then the present cycle of the control sequence is finished.

In the step S4, the controller 70 determines whether the vehicle speed V is higher than 4 Km/h or not. If not, then the present cycle of the control sequence is finished. This is because the opening of the clutch valve 10 has already been controlled into an opening to prevent the engine from stalling based on a clutch opening map, and no control should be effected in a low vehicle speed range in which the detection of the vehicle speed suffers large errors.

If the vehicle speed V is higher than 4 Km/h in the step S4, the control proceeds to a step S5 in which the controller 70 determines the difference A (=Tn−Tn−1) between a time interval Tn from a previous pulse-generating time tn−1 to a present pulse-generating time tn and a time interval Tn−1 from a pulse-generating time tn−2 before the previous pulse-generating time tn−1 to the previous pulse-generating time tn−1 (see FIG. 5). Stated otherwise, the controller 70 determines an increase A from the previous time interval Tn−1 to the present time interval Tn. The increase A corresponds to the deceleration dV/dt of the vehicle speed V.

Thereafter, the controller 70 determines whether the vehicle speed V is decreasing or not in a step S6. If the vehicle speed V is decreasing, since the interval between successive pulses from the rotation sensor 75 progressively increases, the increase A is A>0. If the vehicle speed V is not decreasing, then the present cycle of the control sequence is finished as no clutch opening control process is required.

If the vehicle speed V is decreasing, then the control goes to a step S7. In the step S7, the controller 70 calculates the difference between the time interval Tn−1 and a time interval Tn−2 from a pulse-generating time tn−3 before the pulse-generating time tn−2 to the pulse-generating time tn−2, and then multiplies the calculated difference by a predetermined coefficient α (>1) thereby to determine a value B (=(Tn−1−Tn−2) ×α).

If it is assumed that α=1+β and C=Tn−1−Tn−2, then the value B can be represented by B=C+C×β. The value C is indicative of the increase from the time interval Tn−2 to the time interval Tn−1, and also corresponds to the deceleration dV/dt of the vehicle speed V.

Then, the control goes to a step S8 in which the controller 70 determines whether A>B or not. Since B=C+C×β, the inequality A>B can be expressed by:

$$(A-C) > (A \times \beta).$$

As described above, the values A and C correspond to the deceleration dV/dt, and the difference (A−C) corresponds to the rate $d^2V/dt^2$ of change of the deceleration.

In the step S8, therefore, the controller 70 determines whether the difference (A−C) corresponding to the rate of change of the deceleration is larger than the value (C×β) or not, a process similar to that which is described above with reference to FIG. 3C. In this manner, the controller 70 predicts whether the motor vehicle is decelerated by a panic brake intensive enough to lock the road wheels or not. Inasmuch as the value (C×β) used as a threshold value in this decision step depends on the value C that corresponds to the previous deceleration, the controller 70 can reach a proper decision.

If A>B in the step S8, namely, if the applied brake is a panic brake, the control goes to a step S9 in which the controller 70 produces a control signal to open the third solenoid-operated valve 45. The clutch valve 10 is therefore opened early and quickly to prevent the engine from stalling. A≦B is the step S8, the present cycle of the control sequence is finished as no clutch opening control process is required.

In the step S10, the controller 70 resets the vehicle speed V to 0 Km/h. Therefore, the present cycle of the control sequence comes to an end. Specifically, when the road wheels are locked by the panic brake, no pulses are supplied from the rotation sensor 75, and the vehicle speed is not updated. Accordingly, the normal clutch control process based on the clutch opening map depending on the vehicle speed cannot be carried out.

Once the third solenoid-operated valve 45 is opened and the panic brake mode is started, control goes from the step S1 to a step S11 in a next cycle of the control sequence. In the step S11, the controller 70 determines whether the opening of the clutch valve 10 is an opening corresponding to the stoppage of the motor vehicle. The third solenoid-operated valve 45 is continuously opened until the opening of the clutch valve 10 reaches an opening corresponding to the stoppage of the motor vehicle in a step S13. When the opening of the clutch valve 10 reaches an opening corresponding to the stoppage of the motor vehicle, then the third solenoid-operated valve 45 is inactivated in a step S12.

In the above embodiment, the vehicle speed is detected based on the signal from the rotation sensor 75 which detects the rotation of the output shaft 2 of the hydraulic motor M, and the opening of the clutch valve 10 is controlled based on the vehicle signal thus detected. However, insofar as the clutch valve 10 is closed, since the vehicle speed can be determined from the speed reduction ratio of the continuously variable transmission (namely, the angle of the swash plate of the hydraulic motor M) and the engine rotational speed, the engine rotational speed may be detected by the rotation sensor 75.

Figure 6:
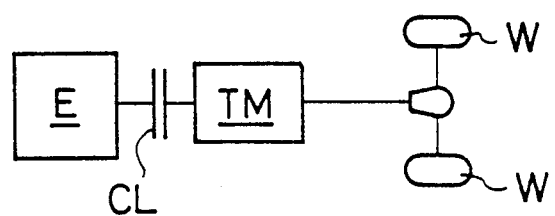
FIG. 6 is a schematic view of the drive train of a motor vehicle to which the method according to the present invention is applied.

The present invention has been described as being applied to the control of the automatic clutch in the hydraulically operated continuously variable transmission. However, the principles of the present invention are not limited to the hydraulically operated continuously variable transmission. As shown in FIG. 6, the present invention may be applied to an automatic clutch control method for hydraulically or electrically controlling a friction-type clutch CL disposed between an engine E and a transmission mechanism TM. The transmission mechanism TM may be of any of various types, e.g., a gear transmission mechanism, a belt transmission mechanism, a hydraulic transmission mechanism, or the like.

Although a certain preferred embodiment of the present invention has been shown and described in detail, it should be understood that various changes and modifications may be made therein without departing from the scope of the appended claims.

We claim:

1. A method of controlling an automatic clutch in a motor vehicle having an engine, road wheels, a transmission, and said automatic clutch for controlling transmitting power of the engine to the road wheels, said method comprising the steps of:
   detecting a vehicle speed from a signal representative of rotation of the road wheels;
   calculating a first value corresponding to a deceleration of the vehicle speed from the detected vehicle speed;
   calculating a second value corresponding to a rate of change of said deceleration from the calculated first value; and
   disengaging the automatic clutch to reduce the transmitting power to zero if said second value is larger than a predetermined value.

2. A method according to claim 1, wherein said predetermined value is set so as to correspond to the magnitude of said first value.

3. A method according to claim 1, further comprising the step of disengaging the automatic clutch when the vehicle speed is reduced to a predetermined speed if said second value is smaller than said predetermined value.

4. A method according to any one of claims 1 through 3, wherein said transmission comprises a hydraulically operated continuously variable transmission having a hydraulic pump actuatable by said engine and a hydraulic motor rotatable by hydraulic pressure supplied from said hydraulic pump, said hydraulic pump and said hydraulic motor being interconnected by first and second hydraulic passages, and wherein said automatic clutch comprises a clutch valve disposed in a third hydraulic passage interconnecting said first and second hydraulic passages for controlling the opening of said third hydraulic passage.

5. A method according to any one of claims 1 through 3, wherein said transmission comprises a friction-type clutch connected to an output shaft of said engine and a transmission mechanism connected through said friction-type clutch to said output shaft of the engine, said friction-type clutch comprising said automatic clutch.

6. A method of controlling an automatic clutch in a motor vehicle having an engine, road wheels, a transmission, and said automatic clutch for controlling transmitting power of the engine to the road wheels, said method comprising the steps of:
   detecting a vehicle speed from a signal representative of rotation of the engine and a speed reduction ratio of the transmission;
   calculating a first value corresponding to a deceleration of the vehicle speed from the detected vehicle speed;
   calculating a second value corresponding to a rate of change of said deceleration from the calculated first value; and
   disengaging the automatic clutch to reduce the transmitting power to zero if said second value is larger than a predetermined value.

7. A method according to claim 6, wherein said predetermined value is set so as to correspond to the magnitude of said first value.

8. A method according to claim 6, further comprising the step of disengaging the automatic clutch when the vehicle speed is reduced to a predetermined speed if said second value is smaller than said predetermined value.

9. A method according to any one of claims 6 through 8, wherein said transmission comprises a hydraulically operated continuously variable transmission having hydraulic pump actuatable by said engine and a hydraulic motor rotatable by hydraulic pressure supplied from said hydraulic pump, said hydraulic pump and said hydraulic motor being interconnected by first and second hydraulic passages, and wherein said automatic clutch comprises a clutch valve disposed in a third hydraulic passage interconnecting said first and second hydraulic passages for controlling the opening of said third hydraulic passage.

10. A method according to any one of claims 6 through 8, wherein said transmission comprises a friction-type clutch connected to an output shaft of said engine and a transmission mechanism connected through said friction-type clutch to said output shaft of the engine, said friction-type clutch comprising said automatic clutch.

* * * * *